United States Patent [19]

Jones

[11] Patent Number: 4,978,415

[45] Date of Patent: Dec. 18, 1990

[54] APPARATUS FOR APPLYING LABELS TO ARTICLES

[75] Inventor: Richard H. Jones, Tadcaster, United Kingdom

[73] Assignee: John Waddington plc, Leeds, England

[21] Appl. No.: 267,691

[22] Filed: Oct. 25, 1988

Related U.S. Application Data

[63] Continuation of Ser. No. 923,843, Oct. 28, 1986, abandoned.

[30] Foreign Application Priority Data

Oct. 20, 1985 [GB] United Kingdom ................. 8526582
Apr. 12, 1986 [GB] United Kingdom ................. 8608954

[51] Int. Cl.[5] .............................................. B32B 31/18

[52] U.S. Cl. .................................... 156/517; 156/256; 156/389; 156/521; 83/168; 83/922

[58] Field of Search ............... 156/250, 256, 267, 268, 156/353, 354, 355, 389, 517, 519, 521, 556, 567, 568; 83/28, 168, 169, 276, 922

[56] References Cited

U.S. PATENT DOCUMENTS

| | | | |
|---|---|---|---|
| 1,336,239 | 4/1920 | Kinraide | 83/168 |
| 1,796,541 | 3/1931 | Schoo | 156/389 |
| 2,715,975 | 8/1955 | Doane et al. | 156/521 |
| 3,032,463 | 5/1962 | Morgan | 156/267 |
| 3,543,623 | 12/1970 | Wirstroem | 83/922 |
| 3,772,120 | 11/1973 | Radzins | 156/521 |
| 3,879,246 | 4/1975 | Walker | 156/519 |
| 3,905,859 | 9/1975 | Patterson | 156/521 |
| 3,966,534 | 6/1976 | Oddy | 156/267 |
| 4,087,304 | 5/1978 | Hamisch | 156/384 |
| 4,181,555 | 1/1980 | Hoffmann | 156/521 |
| 4,181,559 | 1/1980 | Hudson | 156/389 |
| 4,574,817 | 3/1986 | Suzuki et al. | 83/168 |

FOREIGN PATENT DOCUMENTS

| | | | |
|---|---|---|---|
| 636795 | 2/1962 | Canada | 83/168 |

*Primary Examiner*—Caleb Weston
*Attorney, Agent, or Firm*—Klauber & Jackson

[57] ABSTRACT

The invention provides a method for applying labels to articles moved one by one past an application station. The labels are cut from a web which is fed through the machine, the web having adhesive applied to one side thereof which is pressure sensitive immediately before application to the articles. The machine includes cutting rollers which cuts through the adhesive side of the web in order to sever the labels therefrom, and the cutting edges of the cutting roller are kept clean by applying thereto liquid silicone or the like release composition. The liquid silicone is preferably applied by means of sleeves impregnated with the liquid silicone, such sleeves being rotatable on a spindle which is parallel to the axis of rotation of the cutting roller.

The machine also has gearing coupling a device for feeding the web of materials to the cutting location. The cut labels are held by a vacuum drum before being applied to the articles and the gearing is also coupled to said vacuum drum.

The machine is designed to operate continuously so that high speed application of the labels to the articles can be achieved.

5 Claims, 4 Drawing Sheets

APPARATUS FOR APPLYING LABELS TO ARTICLES

This application is a continuation of application Ser. No. 923,843, filed Oct. 28, 1986, now abandoned.

This invention relates to a method of and apparatus for applying labels to articles which are being conveyed by a conveying means past an application station.

In the method and apparatus to which the invention relates the articles move sequentially through the application station, either continuously or intermittently, and high speeds of application can be achieved. As is well known, in mass production, there is a constant need to apply labels to articles as they are produced and/or packaged in large numbers, and with the constant demand for improvement in efficiency and competitiveness, there is a constant demand for high speed machinery and methods in order to achieve higher label application rates.

The label application machinery which is in use today operates in a manner which is dictated by the labels which are being handled. Thus, where the labels are defined in a web of material such as paper having a heat or moisture activatable adhesive on one side thereof, the handling machinery, as set forth in U.S. Pat. Nos. 3451874 and 3630805 is of a nature comprising a severing device which cuts across the web to separate a label from the remainder of the web, and the severed label is held stationary by a suitable means whilst its adhesive is activated, and then it is applied to the article, usually whilst the article is held stationary. As will be understood, such machines operate in an intermittent or stepping basis and therefore are limited by inertia problems as to the speed which can be achieved. Also, the separated labels need to be handled carefully in order that the machine does not lose control of same when they have been severed from the remainder of the web.

When pressure sensitive labels are applied to articles, it is usual to provide a web (the backing web) which has a release characteristic, (for example by being coated with a silicone compound) with the labels adhered to the backing web by means of a pressure sensitive adhesive provided on one side of the labels. The labels are detached from the web by guiding the backing web round an edge of a plate (usually referred to as a "beak") and due to the sharpness of the angle of such beak, the label leading edge separates from the backing web exposing part of the label adhesive surface.

The feed of the web stops with the label partly separated from the web, and complete removal of the label is effected by bringing the article into contact with the exposed adhesive surface of the label. Continued movement of the article completes the removal of the label from the backing web, which then advances until the next label is similarly presented for the next article.

This method, which is most extensively practised, suffers from the speed limitations of the known methods mentioned above in that it is an intermittent method, and inertia considerations place limitations on the speed of operation, although there has been proposed in British Pat. No. 1090708 a method of continuous operation for the application of pressure sensitive adhesive labels carried by a backing web to moving articles, and in such method as the web travels over the beak, the non adhesive side of the label tangentially contacts a rotating vacuum drum, which draws the label from the web and delivers it to an application station whereat the label is pressed to the moving article to become adhered thereto, but although this proposal was made in 1965 there is no evidence of it ever having been used or being in use commercially.

All of the known methods also have the limitation on speed of operation when it comes to ensuring registration of the label with the article when the label is applied. As can be appreciated, as the speed of application increases, so the difficulty of detaching a label from a web and applying it to a moving article increases.

There has been proposed a general method for the high speed application of labels to moving articles in European Pat. Application No. 82306505.7, and whilst such proposal represents in its own right an advancement in the art of label application in that it provides an arrangement enabling high speed application of labels, the present invention provides yet a further improvement in the high speed application of labels to articles.

Also, the rapid application of pressure sensitive labels to moving articles brings special problems. The equipment which handles the labels must be kept free of the adhesive, which could cause inefficiency of application or failure of the process if the equipment becomes clogged with the adhesive.

In the known methods, the labels are carried by a release web which has a surface defined by, for example, a silicone composition to which the pressure sensitive side of the label adheres only lightly, and the labels are removed from the release web and are applied to the articles without contacting any part of the application so that the said clogging of the machinery is avoided. However, because the labels are handled in this way, the speed of application is limited and the machinery is expensive because of the need to handle the release web.

The present invention is concerned with an improved method and machine for the handling of a pressure sensitive adhesive label wet, whereby the difficulties as aforesaid are obviated or mitigated, and in particular the use of a release web is not necessary, the machine and method of the invention being arranged to avoid the clogging which can take place when pressure sensitive adhesive labels are handled.

According to a first aspect of the present invention, a method of applying labels to articles which are moved sequentially through an application station comprises feeding a web with labels thereon and activated adhesive on one side thereof to a severing station at which the labels are cut from the web, said severing station being defined by the nip of a drum and cooperating roller, of which the drum forms an anvil and the co-operating roller has die cutting edges which cut the labels from the web by cutting through the adhesive side of the web and wherein a co-operating lubricating device treats the surface of the co-operating roller, said device comprising carrying liquid lubricating medium which is applied to the co-operating roller as it rotates keeping the said die cutting edges clear of adhesive at least for a plurality of label cutting actions.

Preferably, the said drum is a vacuum drum to which the cut labels are held when cut by the die cutting edges.

The said device preferably comprises a spindle having a resilient surface means which carries the liquid lubricating medium, said resilient surface preferably being defined by a closed cell neoprene rubber, flexible sleeve, which may be in several spaced sections which are carried on collars independently rotatable on the spindle.

Preferably, the spindle is mounted in a pair of pivotable, spring loaded brackets which ensure that the said lubricating spindle is resiliently urged onto the co-operating roller, but can readily be removed by swinging the said brackets away from the co-operating roller. When the lubricating roller is removed is may be cleaned and re-impregnated with the lubricating liquid.

The position of the brackets may be adjusted to adjust the spring loading of the lubricating spindle on said co-operating roller.

When the adhesive is a pressure sensitive adhesive, the liquid lubricating material may be a liquid silicone preparation.

When the liquid medium in the lubricating device has been used up or is contaminated, the spindle is removed, cleaned if necessary and re-impregnated by immersing the sleeve in the lubricating liquid. By using a closed cell neoprene rubber foam, it is ensured that whilst the liquid lubricating composition gathers in the open cells at the surface of the sleeve, the liquid composition does not penetrate into the closed cells in the foam.

The adhesive which is used on the web may be conventional and will normally be of a nature which is pressure sensitive when the labels are applied to the articles as it is the contact between adhesive and articles which achieves the application of the labels to the articles; the adhesive may be naturally pressure sensitive in which case when the labels are in roll form, the adhesive surface must face a surface which has a release characteristic and this can be achieved by ensuring that the other side of the web has this characteristic e.g. by having a coating applied thereto or by using an appropriate material for the web, or by winding the web with a release material web (which is stripped from the adhesive before the label web is presented to the cutting nip) between the coils.

Alternatively, the adhesive may be of a type which in its natural state is dry but becomes pressure sensitive when activated and one such adhesive is a heat activated adhesive. The advantage of using this arrangement is that it is not necessary to apply any release material to the web, or use a release material for the web or as an isolating web. Where a heat activated adhesive is used, there may be an activating heater arranged to activate the adhesive after the web has been unrolled but before the web passes through said cutting nip.

The invention provides a novel system for the application of labels in which the cutting takes place by cutting die edges cutting through the adhesive and a means is provided for keeping the cutting roller clean whereby the continuous running of the apparatus without frequently shutting same down for cleaning the cutting roller is provided.

All of the known methods also have the limitation on speed of operation when it comes to ensuring registration of the label with the article when the label is applied. As can be appreciated, as the speed of application increases, so the difficulty of detaching a label from a web and applying it to a moving article increases.

The present invention according to another aspect seeks to provide a method and apparatus for the high speed application of labels to moving articles in which effective registration of the labels and articles and registration in the cutting of the labels from the web is achieved.

According to a second aspect of the present invention, a method of applying labels to moving articles comprises feeding continuously a web with labels printed thereon and adhesive on one side thereof to a severing station at which the labels are cut from the web, said severing station iceing defined by the nip of a vacuum drum and co-operating roller, one of which forms an anvil and the other has die cutting edges which cut the labels from the web, with the adhesive side facing away from the drum leaving a skeletal waste web which is led away from the severing station, holding the labels by vacuum to the drum until they reach an application station at which the adhesive side is applied and becomes adhered thereto, characterised by means ensuring register between the feed of the labels and the die cutting of same from the web, such means comprising for example providing that the web has sprocket holes which are in registry with the labels on the web and which engage teeth or projections on a registration device which is geared to the said drum to keep the severing of the labels in registry with the label pitching.

Preferably, the vacuum drum is geared to a conveying mechanism for conveying the articles one by one past the drum to receive labels in turn. The gearing between the conveying mechanism and the drum ensures synchronization of the drum and conveying mechanism.

The conveying mechanism may include a star wheel having pockets to receive individual articles, which may for example be relatively flat bottles, the labels being applied to one side thereof.

The star wheel may co-operate with a pressure roller which presses the labels to the articles as they pass the pressure roller, one by one.

The co-operating roller preferably is the die cutting roller and is provided with die cutting edges defining the shape of the labels, and the die cutting roller may be in co-operation with a cleaning roller serving to keep the die cutting roller clean, as the die cutting roller cuts through the adhesive coated side of the web, and such adhesive will normally be activated i.e. tacky as it passes between the die cutting roller and the vacuum drum. The cleaning roller may be formed by a silicone or the like impregnated roller which forms a nip with the die cutting roller but at a circumferentially spaced location relative to the nip between the die cutting roller and the vacuum drum.

The gearing between the vacuum drum die cutting roller and star wheel may comprise spur and helical gears for adjustment and correct direction of rotation.

There may be a main motor for driving the vacuum drum and components geared thereto, and in addition there may be an unwind motor coupled to unwind the web from an unwind reel and a rewind motor coupled to wind the skeletal waste onto a take up reel.

The various drums and rollers may be arranged on a mounting plate or frame with their axes parallel.

With the method of the second aspect of the invention, high speed application (up to 400 per minute and beyond) with high registration accuracy of labels to articles can be achieved, which has not been possible with the arrangements used heretofore.

The invention also provides apparatus for carrying out the method.

An embodiment of the invention will now be described, by way of example, with reference to the accompanying drawings, wherein.

Figure 1:
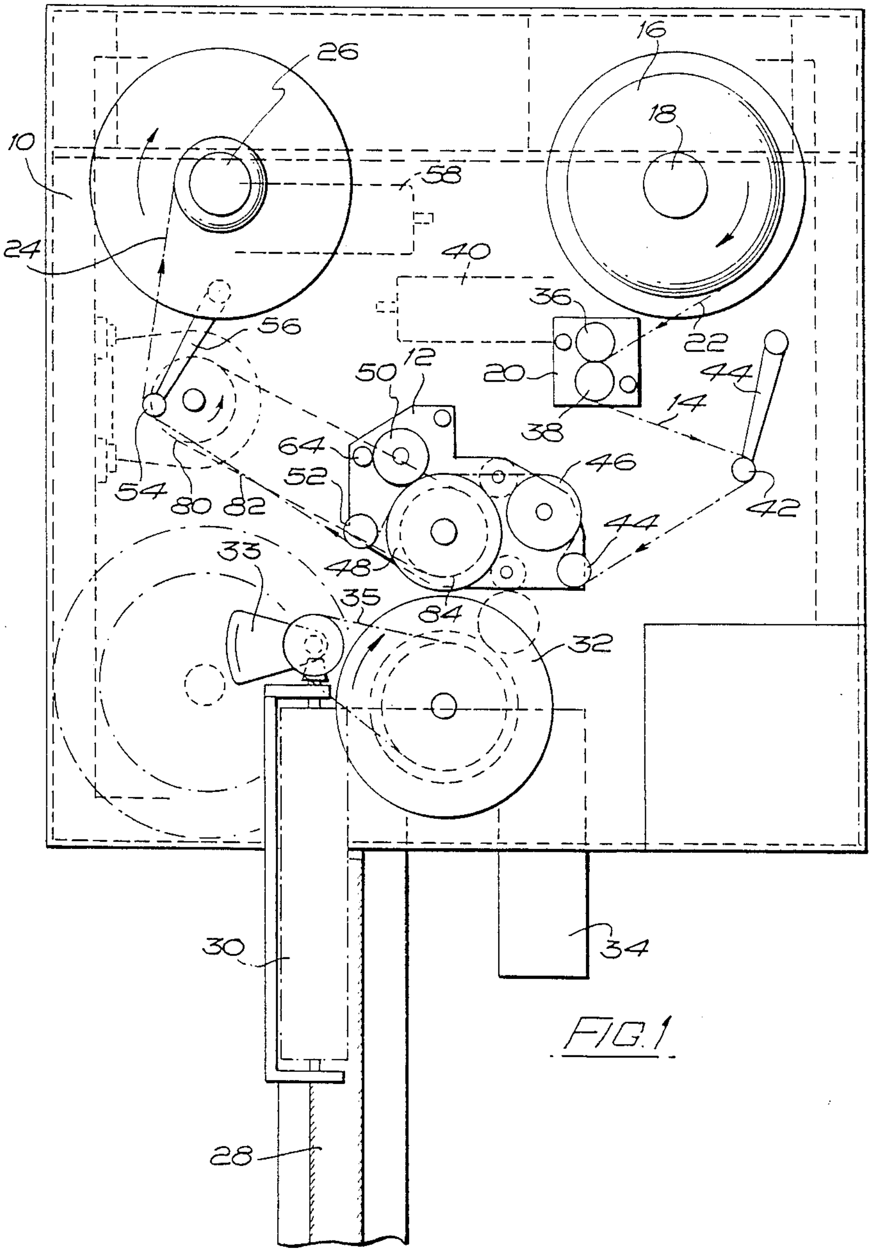
FIG. 1 is a plan of a machine according to, and for carrying out the method according to, the present invention.

Referring to the drawings, in FIG. 1 there is shown in plan view a machine according to the invention, and which operates in accordance with the method of the invention. The machine comprises a support plate or decking 10 carrying a number of rotatable components provided for the feeding of label stock material so that labels cut therefrom can be applied to individual articles which are conveyed to an application head 12 of the machine to have labels applied thereto. The label stock material is indicated by numeral 14, and it is provided on the machine in the form of a roll 16 mounted on a shaft 18. An unwind unit 20 serves to draw the web material 14 as indicated by arrow 22 from the roll 16. The material 14 travels through the application head 12 where individual labels are removed in a manner to be described, and the skeletal waste of the material 14, indicated by numeral 24 is wound on to a rewind shaft 26.

The articles, in this case plastic bottles of flattened construction, are fed on a bottle conveyor 28 until they arrive at a feed screw 30 designed to engage and pitch the bottles in a regular pitching to feed same to a star wheel 32 having pockets into which the bottles are placed so that the bottles will be conveyed around the circumference of the star wheel and be presented in turn to the application head 12 to receive labels. The labelled bottles are discharged on a bottle outlet dead plate 34 from which they are removed either automatically or manually. The wheel 32 drives a cam 33 through a belt 35 and the cam 33 actuates a pneumatic switch; the cam is for giving an air blast to detach labels from drum 48 as will be explained hereinafter.

Because the labels are cut individually from the web 14, and as the web moves continuously through the machine, very high speed application of labels can be achieved i.e. up to and beyond 400 labels per minute. The material 14 is provided with an adhesive on one side which, when the labels are applied to the bottles, is in an active condition. That is to say, the adhesive has pressure sensitivity so that application of the label to the bottle will ensure adhesion between the label and bottle so that the label is carried away by the bottle. The adhesive may be of a naturally pressure sensitive type, or it may in the alternative be of a type which has to be activated, for example by heat or moisture, in which case it will be necessary to provide in the machine a means for activating the adhesive after the web has been unrolled and before the labels are applied to the bottles.

In the machine illustrated in the drawings, it is envisaged that a web of labels with a pressure sensitive adhesive coating on one side, and a release coating or characteristic on the other side will be provided, as this enables the roll of labels to be wound into the roll 16 without requiring any separating release web, although it is within the invention to provide such separating release web.

With this arrangement, it is necessary therefore to ensure that all surfaces which contact the pressure sensitive side of the web should be such as not to adhere to the pressure sensitive adhesive. That is, the contacting surfaces should have a release characteristic in relation to the adhesive used.

The web also is preferably provided with sprocket holes in the edge regions thereof, and such sprocket holes are pitched to correspond to the pitching of the printing of the labels on the web, so that, as will be explained, a sprocketed rotatable member can be used for maintaining registration between the device cutting the labels from the web and the printing. In those areas at the edge of the web where the sprocket holes are provided, it is preferred that there should be no adhesive, because if such areas were adhesive coated, during the manufacturing process, the adhesive would tend to creep or flow through the sprocket holes, and out of the end of the roll creating difficulties in the manufacture.

The path of travel of the web 14 through the machine will now be described in more detail.

As shown in FIG. 1, the unwind unit comprises a pair of nip rolls 36 and 38, of which roll 36, being the roll which contacts the adhesive side of the web, should be of a release characteristic material. The roll 36 is driven by means of an unwind motor 40, and from the roll 38 the web 14 passes round a guide roller 42 mounted on the end of a tension control arm 44 (which may be spring loaded). The tension control arm 44 is linked via suitable control circuitry to the motor 40 so that depending upon the tension in the web 14 sensed by the arm 44, so the speed of motor 40 is adjusted in order to control the speed of unrolling of the web 14.

From pulley 42, web 14 passes round a guide roller 44, and then round a registration roller 46 which is provided with the sprocket teeth engaging the sprocket holes in the web. From registration roller 46 the web passes round a vacuum drum 48 which is in cooperation with a die cutting roller 50 having die cutting edges (one or more) of the shape of the labels to be cut from the web. The die cutting roller 50 and vacuum drum 48 operate as a die cutting and anvil arrangement ensuring the removal of labels from the web. The labels travel with the drum 48, to the interior of which a vacuum is applied, whilst the skeletal waste 24 travels first round a guide roller 52 which is similar to roller 44, and then round a guide roller 54 supported on a tension arm 56 which operates much in the same manner as the arrangement 44, 42 to control the speed of a rewind motor 58 driving the rewind shaft 26. The labels which are held to the vacuum drum 48, with the adhesive side outermost are moved into a position by the drum 48 so as to meet the travelling articles in the star wheel 32, and at the point of application, there is a means arranging for an air blast to be applied to the labels held by the vacuum drum, so as in fact to blow the labels from the vacuum drum on to the articles carried by the star wheel. There is no pressure contact between the vacuum drum and articles at this point and the labels are blown across a space clearance from the vacuum drum to the articles. The labels and article surfaces are moving linearly at the same speed.

Figure 2:
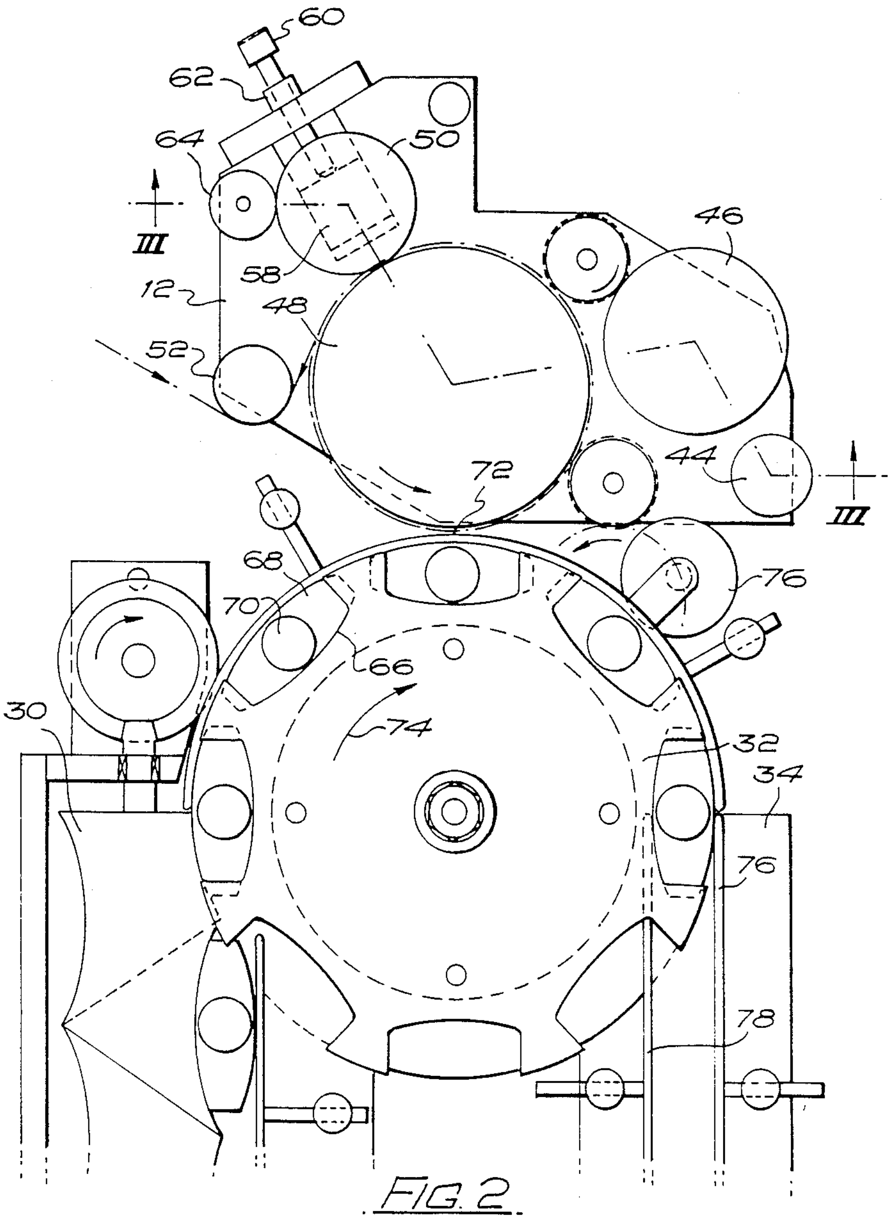
FIG. 2 is an enlarged plan showing part of the machine shown in FIG. 1.
Figure 3:
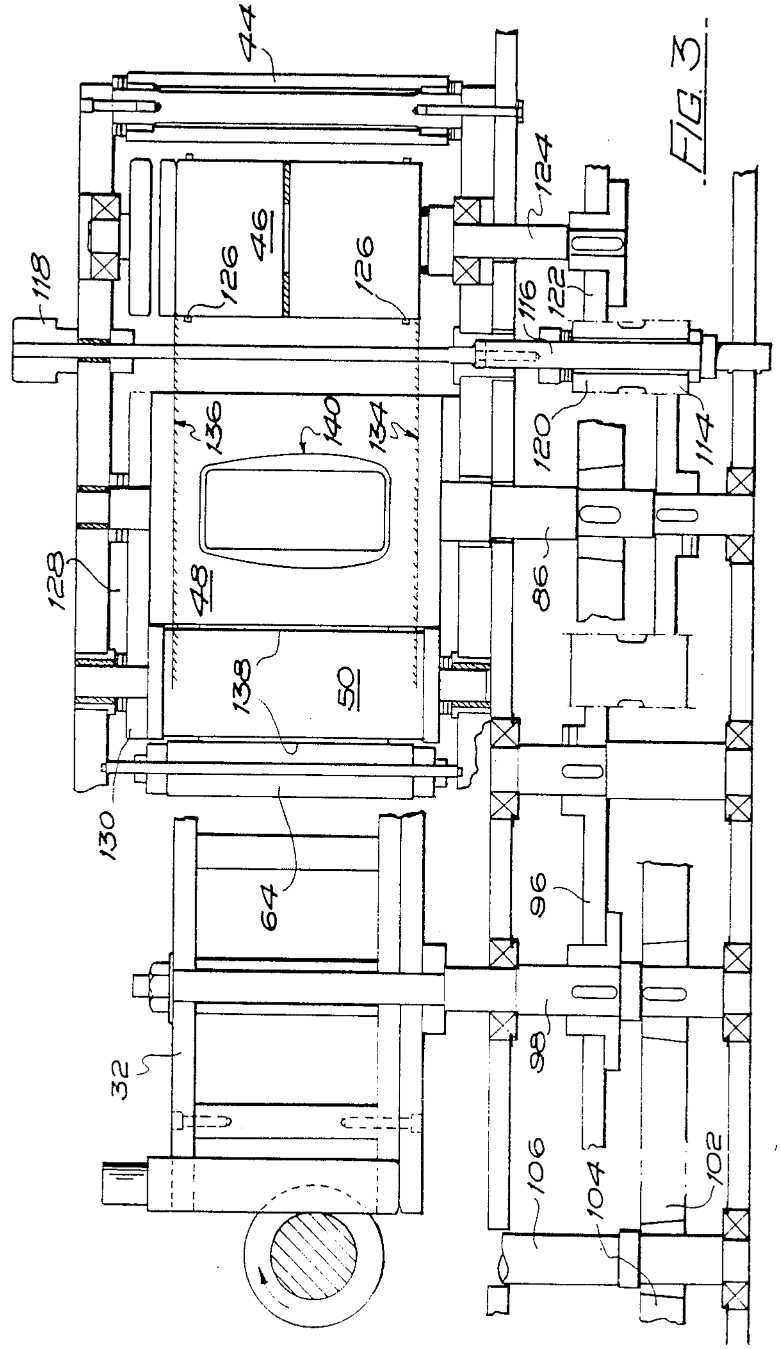
FIG. 3 is a developed sectional view taken through the line III - III of FIG. 2.
Figure 4:
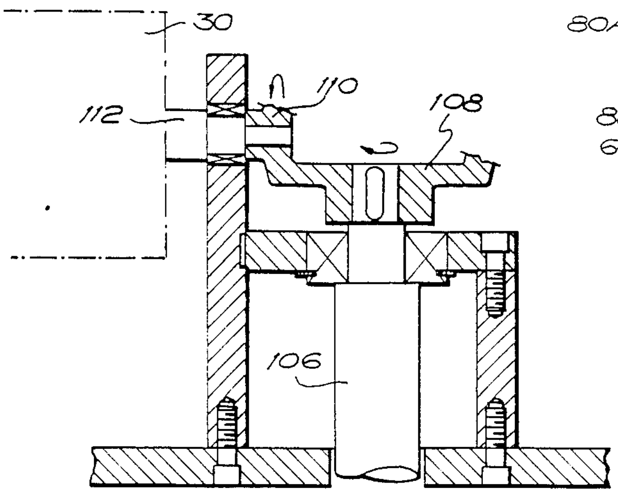
FIG. 4 is a sectional view of part of the machine, the section being viewed in the direction of arrow 'X' of FIG. 3.

Referring now to FIGS. 2 to 4, the applicator head 12 and bottle feed arrangement are shown in greater detail.

As shown in FIG. 2, the die cutting roller 50 is mounted in bearing blocks 58 enabling the movement of the roller 50 towards and away from vacuum drum 48, so that the pressure between these two rotating members may be adjusted, pressure adjustment means being provided by adjusting screws 60 and locking nuts 62. A roller 64 which keeps the die cutting roller 50 clean co-operates with the die cutting roller 52 and serves to clean adhesive from die cutting roller 50 and in particular the die cutting edges thereof as these edges will in fact penetrate through the pressure sensitive adhesive in cutting the labels from the web.

FIG. 2 also shows the design of the star wheel 32, and illustrates the shape of the pockets 66 which receive the bottles 68, whose shape can be clearly ascertained in FIG. 2. The outer curved portions 70 of the bottle 68 receive the labels at the application station 72 where the bottle surfaces 70 receive the labels from the vacuum drum 48 as explained herein.

As the bottles travel with the labels applied thereto beyond the application station 72 (and the direction of rotation of the star wheel as indicated by arrow 74) the bottles meet an idler pressure drum 76 which applies a wiping pressure to the applied label ensuring that it is adhered over its entire surface to the bottle 68. The outer surface of the drum 76 may be of a complient resilient material such as flexible foam to ensure the application of even pressure to the applied label. FIG. 2 also shows that the bottles which have been labelled are fed into a guide on the dead plate 34, such guide being made up of a pair of parallel plates 76 and 78 which are spaced to correspond to the width of the bottle.

The bottle infeed screw 30 is also shown in FIG. 2, which illustrates that the flights are contoured to the shape of the bottle. The screw 30 will preferably be formed in plastics material.

FIG. 3 shows the basic gearing arrangement between the rotary components of the machine, and in this connection reference is made briefly again to FIG. 1 which shows a main drive motor 80, which is connected by means of an endless drive member 82 to a drive sprocket 84 connected to the drum 48. The sprocket 48 is shown in FIG. 3, and it will be seen to be secured to a shaft 86 fast with the drum 48. Also mounted on shaft 86 is a drive gear 88 which drives an idler gear assembly 90. Gear 90 meshes with a drive gear 92 on idler shaft 94, and gear 92 engages a gear wheel 96 on a shaft 98 which carries the star wheel 32. A further gear 100 on shaft 98 drives an idler gear 102 which also meshes with a driven gear 104 on a shaft 106. At the top of shaft 106 as shown in FIG. 4 there is a bevel gear 108. Bevel gear 108 meshes with a bevel pinion 110 secured to the end of shaft 112 carrying the feed acre 30.

It will be seen therefore that the vacuum drum 48 is connected through the various gears so as to drive in synchronism the star wheel 32 and the feed screw 30.

Synchronization of the rotation of the other components of the applicator head is achieved in that the gear 88 also drives a further gear cluster 114 rotatable on an adjustment shaft 116, adjustment of which is achieved by the turning of a hand knob 118 at the top of shaft 116. The teeth of gear 114 and those of gear 88 are axial teeth, but a second ring of teeth 120 on gear 114 is made up of helical teeth which engage a helical gear 122 on shaft 124 to which is drivingly mounted the registration roller 46 of which the sprocket teeth 126 are shown.

The registration roller 46 is therefore driven in synchronism with the vacuum drum 48, but if it is desired to "fine tune" the registration of the labels with the die cutting roller 50 and the vacuum roller 48, this can be done by turning the knob 118, which has the effect of raising the shaft 116 or of lowering it, and the effect of this is to alter the angular adjustment of gear 122 and therefore the angular adjustment of roller 46, relative to the vacuum drum 48. The upwards or downward movement of the cluster 114 has no effect as concerns the engagement between the teeth of cluster 14 and gear 88, as these teeth are straight, but the lifting or lowering of cluster 114 effects rotation of the gear 122 due to the helical nature of the teeth of gear 122 and ring 120, whereby the adjustment is achieved. The die cutting roller is geared to the vacuum drum 48 directly via gears 128 and 130 respectively secured to the shaft 86 of vacuum drum 48 and shaft 132 of the die cutting roller.

FIG. 3 shows the edges of the label web at 134 and 136, and also shown are the cutting dies 138 on the die roller 50, and finally the label shape for this example of the invention is indicated by numeral 140.

To achieve the holding of the labels as indicated by 140, the drum 48 has a periphery which is perforated so that a vacuum applied to the interior of the drum will hold the labels to the drum circumference, but otherwise the drum circumference should be smooth and hard as it forms an anvil surface. It is also preferred that the positioning of the apertures forming the perforations of the drum should be in registry with the die cutting edges 138 so that these edges will not extend over apertures during the cutting operation. Where the labels are for example square, then it is preferred that the die cutting edges be arranged to engage the anvil drum between lines of perforations. The operation of the vacuum holding and blowing of the labels by drum 50 is described in European Pat. Application No. 82306505.7.

Figure 6:
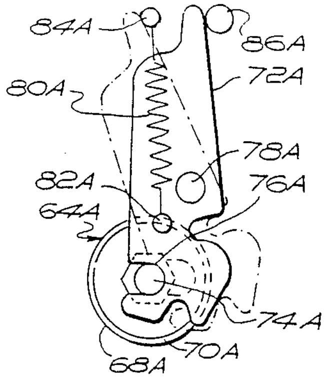
FIG. 6 is a plan of a component of the part of the machine shown in FIG. 2.
Figure 5:
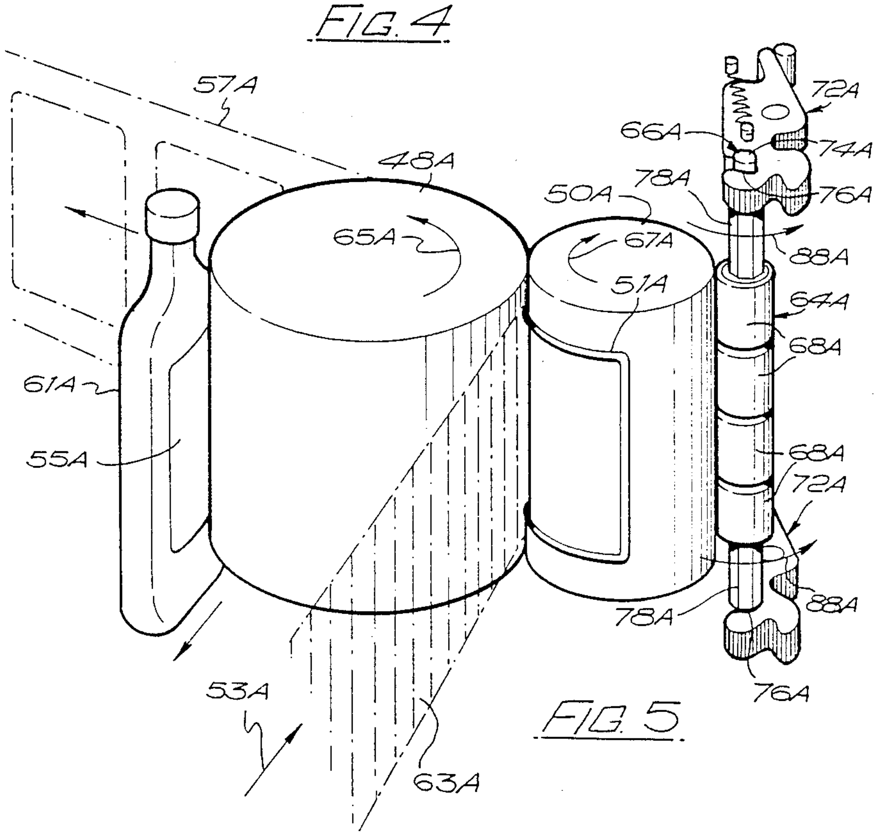
FIG. 5 is a perspective diagrammatic view showing part of the machine of FIG. 1.

Referring now to FIGS. 5 and 6, in FIG. 5, the vacuum drum 48, the cutting roller 50 and the lubricating roller 64 are shown in perspective elevation, and during the act of cutting labels from the web and applying same to bottles to which a label is being applied is also shown.

It can be seen that the cutting roller is provided with die cutting edges 51A defining the shape of the labels to be cut from the web, and the operation of label application will be clearly understood from FIG. 5 insofar as the web travels as indicated by the arrow 53A to the nip between the vacuum drum and cutting roller, and during this passage through the nip, the cutting edges 51A cut a label 55A from the web. The label is held to the drum while the skeletal waste 52A of the web moves away as indicated by the arrow 59A. The label 55A held to the vacuum drum is carried round with the drum until it meets the bottle 61A which is being moved in synchronism with the drum 48A in tangential relationship thereto and the label is transferred from the drum to the bottle 61A.

The outer side 63A of the web as regards its passage round the vacuum drum 48A is the activated adhesive side, and it can be seen therefore that the cutting edges 51A in fact cut through the activated adhesive. As the process of cutting labels from the web is a continuous process insofar as the drum and cutting roller rotate continuously as indicated by the arrows 65A, 67A, and the web is fed through the nip between the vacuum drum and cutting roller, the cutting edges would quickly become contaminated and clogged with adhesive which would impair the cutting operation and eventually lead to shut down of the apparatus, were it not for the provision according to the present invention of means for lubricating and keeping clean the said cutting edges.

The means in the specific embodiment of the invention is the lubricating roller 64A which as shown clearly in FIG. 5 contacts the cutting roller tangentially at a location angularly spaced from where the cutting roller co-operates with the drum. The lubricating roller comprises a spindle 66A on which are mounted four individually rotatable sleeves 68A. Each sleeve 68A is provided with an outer covering 70A of a closed cell neoprene rubber foam which is flexible and resilient. The foam of the sleeves 68A, contacts the cutting roller as shown, and in use, these foam sleeves 68A are impregnated with a lubricating composition for lubricating the cutting edges, and typically such cleaning composition may comprise a conventional silicone composition. By using a flexible closed cell foam, the lubricating composition will collect in the open cells at the surface of each foam sleeve 68A, but will not penetrate into the closed cells within the thickness of the covering 70A. This means that a substantial amount of lubricating composition will collect at the surface of each covering 70A, but the sleeve 68A will not be completely impregnated with the composition which would mean that there would be too much composition contained in the sleeve 68A, which would in fact in use drain axially of the cleaning roller 64A and means would have to be provided for collection and perhaps re-circulation of same. The lubricating roller 64A is mounted on a pair of pivot brackets 72A which are spring loaded, so that the lubricating roller will be urged resiliently into tangential contact with the cutting roller 50A. As the cutting and lubricating rollers 50A, 64A rotate, so the lubricating composition effects lubricating of the cutting edges 51A enabling longer uninterrupted operation of the cutting roller to take place than would otherwise be the case if the lubricating roller were not provided.

The spindle has short circular stub axle ends 74A which engage in slots 76A in the brackets 72A so that the roller 64A can readily be removed from the brackets 72A, and in addition, between the sleeves 68A and said stub axle ends 74A, there are hexagonal section spindle portions 78A which engage with stops (not shown) which prevent the spindle from rotating when in the operative position as shown in FIG. 5. The sleeves 68A are of course freely rotatable on the spindle so that they will turn as the cutting drum turns.

One of the brackets 72A is shown in plan view in FIG. 6, and the lubricating roller 64A is shown in operative relationship thereto in that one of the stub axle ends 74A is shown engaging in the bracket slot 76A. The bracket 72A is mounted for pivoting movement about the pivot point 78A, and a tension spring 80A acts between a mounting 82A on the bracket 72A and a fixed mounting 84A on the machine frame urging the bracket 72A in a direction pushing the roller 50A lightly into contact with the cutting roller 48A. The tension in the spring 80A is variable in order to vary this pressure, and the spring tension adjustment may be provided for by arranging for either of the said mounting 82A, 84A to be position adjustable.

Alternatively, a stop pin 86A mounted on the machine frame and limiting the extent to which the bracket 72A can pivot the lubricating roller 64A towards the cutting roller 50A may be position adjustable in order to control the degree to which the foam of the sleeves is compressed in contacting the cutting roller surface.

When the composition contained in the roller sleeves has been used up, or is contaminated such that the lubricating roller has to be cleaned and/or replenished with the composition, the roller can readily be removed by swinging the brackets as indicated by the arrows 86A in FIG. 5, and by removing the stub axles of the roller from the bracket slots 76A. Cleaning and replenishment of the lubricating roller can be effected in any suitable manner.

It should be mentioned that it is not necessary to use a roller for the application of the lubricating composition as this could be done in the alternative by means of a spray, brush or other device.

By the use of a liquid silicone device for keeping the cutting roller clean so long uninterrupted running of the machine can take place the device is simple in nature and is simple to maintain. High application speed can be obtained.

The silicone cleaning device can be used in other types of machines such as machines which operate on an intermittent basis and which do not require the web to have sprocket holes, and wherein registration is obtained by other means, for example by photoelectric sensing devices.

Also, the die cutting roller may simply cut across the entire width of the labels in order to cut them from the web so that there will in fact be no skeletal waste.

By virtue of the invention, a system is provided in which cutting of labels is effected by a cutting die edge penetrating through the adhesive side of a web, and such a cutting device is in the form of a roller which can be rotated continuously as the cutting edges thereof are continuously lubricated by means of liquid lubricating composition.

I claim:

1. Apparatus for applying labels to articles which are moved sequentially through an application station, comprising:

feeding means for feeding through the apparatus a web with labels thereon and activated adhesive on one side thereof, a severing station at which the labels are cut from the web, a drum and co-operating roller comprising a nip forming said severing station, said drum being an anvil, and die cutting edges on said co-operating roller, the cutting edges serving to cut the labels from the web by cutting through the adhesive side of the web and including a lubricating roller in tangential contact with the co-operating roller, support means for supporting the lubricating roller so that it is free to float towards and away from the co-operating roller, and spring means for urging the lubricating roller against the co-operating roller, said lubricating roller carrying liquid lubricating medium which is applied to the co-operating roller as it rotates, keeping said die cutting edges clear of adhesive at least for a plurality of label cutting actions.

2. Apparatus according to claim 1, wherein said drum is a vacuum drum to which cut labels are held when cut by the die cutting edges.

3. Apparatus according to claim 1 or 2, wherein said lubricating roller comprises a spindle having a resilient surface means which carries liquid lubricating medium, said surface being defined by a closed cell neoprene rubber flexible sleeve, which is in several spaced sections which are carried on collars independently rotatable on the spindle.

4. Apparatus according to claim 3, wherein said support means comprises a pair of pivotable spring loaded brackets which ensure that said lubricating spindle is resiliently urged onto the cooperating roller, but can readily be removed by swinging said brackets away from the co-operating roller.

5. Apparatus according to claim 4, wherein the position of the brackets may be adjusted to adjust the spring loading of the lubricating spindle on said co-operating roller.

* * * * *